United States Patent [19]
Meyer

[11] Patent Number: 5,804,963
[45] Date of Patent: Sep. 8, 1998

[54] INDUCTIVE DISPLACEMENT SENSOR WITH A CURSOR AND A MOVABLE COUPLING SCALE

[76] Inventor: Hans Ulrich Meyer, 42, Rue de Lausanne, 1110 Morges, Switzerland

[21] Appl. No.: 785,766

[22] Filed: Jan. 21, 1997

[30] Foreign Application Priority Data

Jan. 24, 1996 [CH] Switzerland ................. 179/96

[51] Int. Cl.⁶ .................. G01B 7/00; G01D 5/20; G08C 19/06
[52] U.S. Cl. .................. 324/207.17; 324/207.18; 324/207.24; 336/45; 340/870.32
[58] Field of Search ........... 324/207.11, 207.15–207.19, 324/207.22–207.24, 207.25, 239–243, 163, 164, 173; 336/45, 130, 136; 340/870.32, 870.33, 870.35, 870.36; 318/653, 656, 657, 661

[56] References Cited

U.S. PATENT DOCUMENTS

| | | | |
|---|---|---|---|
| 4,100,485 | 7/1978 | Rogers | 324/207.17 |
| 4,417,208 | 11/1983 | Hachtel et al. | 324/164 |
| 4,697,144 | 9/1987 | Howbrook | 324/207.17 |
| 4,717,874 | 1/1988 | Ichikawa et al. | 324/207.24 X |
| 5,109,193 | 4/1992 | Pike | 324/207.17 |

FOREIGN PATENT DOCUMENTS

| | | |
|---|---|---|
| 0 557 608 | 9/1993 | European Pat. Off. . |
| 30 14 137 | 10/1981 | Germany . |
| 847158 | 9/1960 | United Kingdom .............. 324/207.17 |
| 2 065 897 | 7/1981 | United Kingdom . |

OTHER PUBLICATIONS

Inductosyn Principle and Applications, Farrand Controls, Inc., 99 Wall Street, Valhalla, NY, pp. 1–4 undated.

*Primary Examiner*—Gerard R. Strecker
*Attorney, Agent, or Firm*—Young & Thompson

[57] ABSTRACT

The inductive displacement sensor includes a first element of cursor (31) and a second element or scale (32) exhibiting spatially periodic electromagnetic characteristics, such as windows (321) and traverses (322). The first element (31) has a series of windings, e.g., three interlaced meander windings (31A to 31C) and an electronic circuit being connected to the windings on the first element to bring about a current in at least one of the windings (31A) and to measure the influence due to the position of the second element's spatially periodic electromagnetic characteristics on the inductances of at least a part of the windings (31B, 31C) of the first element (31). Such a displacement sensor is simple, rugged, small, draws little current and is insensitive to water.

14 Claims, 7 Drawing Sheets

INDUCTIVE DISPLACEMENT SENSOR WITH A CURSOR AND A MOVABLE COUPLING SCALE

FIELD OF THE INVENTION

The invention is an inductive displacement sensor comprising two elements movable relatively to each other along a path, provided with windings arranged along the path and whose inductances vary as a periodic function of the relative displacement of the two elements, and electronic means for determining the value of the displacement from the measure of the winding's inductances.

BACKGROUND OF THE INVENTION

The resolver and the synchro are two known rotary embodiments of such sensors. They comprise a rotary element, or rotor, with a primary winding and a fixed element, or stator, with two or three secondary windings whose couplings with the rotor winding vary sinusoidally with the rotor's angular displacement. Electronic means, e.g., a synchro-to-digital converter, determine the rotor's angular displacement from the amplitude and phase of signals coupled into the stator windings by a periodic reference signal in the primary winding. The accuracy of such sensors may attain a few minutes of arc.

Another known embodiment of a rotary or linear sensor working on the same principle is the Inductosyn of Farrand Controls Inc., Valhalla, N.Y., where the surfaces of both elements, facing each other with a typical gap of 0.25 mm, carry flat hairpin turn or meander windings with a typical meander cycle, of 2 mm. Accuracies to a micrometer for the linear version or to a second of arc for the rotary one are feasible.

These sensors are mainly used in avionics and machine tools because of their ruggedness and their insensitivity to contaminants, such as water and oil. But the measuring frequencies are low, ranging from 400 Hz to 10 kHz to limit losses and distortions. The poor efficiency due to these low frequencies and, in the case of the Inductosyn, the small winding inductances imply a high current consumption; moreover, the need for flexible connections or sliding contacts between both relatively movable elements increases overall size and price. These shortcomings limit their application. They can e.g. not replace capacitive sensors in calipers and other small measuring tools running on batteries to make them immune to water.

SUMMARY OF THE INVENTION

The object of the invention is to remedy these shortcomings and is characterized, to this end, in that the windings are arranged on a first of the two elements and in that the second element exhibits spatially periodic electromagnetic characteristics of spatial period T along the path susceptible to modify the inductances of said windings, the electronic means being connected to the windings on the first element to bring about an electric current in at least a part of the windings and to measure the influence due to the position of the second element's spatially periodic electromagnetic characteristics on the inductances of at least a part of the first element windings.

Flexible interconnections or sliding contacts between both elements being thus eliminated, the sensor becomes simpler, cheaper and smaller. The absence of windings and connections on the second element, or scale, often quite long, allows high frequency measuring signals, where the winding's impedance is higher than their ohmic resistance, thus improving the sensor's efficiency.

Advantageously, the first element is provided with windings or groups of windings with a spatially periodic configuration of spatial period 2T along the path. The influence of the second element on these windings now extending over a length of many spatial periods T is thus reinforced and errors from local variations of the influence reduced.

The electronic means may advantageously bring about an electric current in a first part of the windings, becoming at least temporarily inductors, and to measure the signals at least temporarily induced in a second part of the windings. As mutual inductance is thus being measured, errors due to variations in self-inductance are decreased, if not eliminated.

Favorably, the second part of the windings is arranged in quadrature with the first part of the windings, i.e., spatially shifted by T/2 for a spatial winding period of 2T, thus canceling direct mutual coupling to the benefit of mutual coupling via the second element.

A very advantageous arrangement is characterized in that the first element comprises N windings interlaced on the same surface and mutually shifted by some integer number of times the distance T/N along said path. This yields a very small first element, optimal coupling conditions and above all a decreased sensitivity to geometric imperfections. Notably changes in the gap between both elements, due to form and guiding misalignment, remain small over small distances and affect a set of interlaced windings only slightly, all the less as local errors are averaged over the winding's area.

In a preferred design, the windings are each made of two partially superposed meanders going back and forth, connected together on one end and to electronic means on the other. This design minimizes interconnection lengths as well as parasitic inductance and electromagnetic radiations, and multiplies inductance by four for a given area.

Advantageously, windings may be tapered towards both ends of the first element so as to equalize the mutual inductances of a linear embodiment and to reduce a finite length sensor's sensitivity to misalignment.

Advantageously, the inductive mutual coupling between first element windings may be realized via induced currents or eddy currents in the second element, which is suitably provided with a spatially periodic conducting configuration, of spatial period T along the path. Many embodiments are possible, for example a series of conducting rings or areas on an insulating substrate, or a conductor shaped as a ladder or a punched tape, or with a periodic relief pattern. Such scales are easy to manufacture in a wide range of materials.

Favorably, the electronic means are designed to measure mutual inductance between at least two windings or groups of windings of self-inductance L and resistance R by applying on the terminals of at least one winding or group of windings a voltage pulse shorter than the time constant L/R and by measuring the induced pulse on the terminals of at least one other winding or group of windings. Very short measuring signals are thus obtained, and their repetition rate can be made slow enough to yield a very low average current consumption. Such short pulses also result in good sensor efficiency as resistive losses remain low.

A preferred embodiment comprises three Y-connected meander windings, mutually shifted by an integer number of times the distance T/3 along said path, the electronic means being implemented to apply a voltage pulse on the terminals of one winding and to combine the pulses induced in the two other windings so as to get a sampled signal equivalent to the one from a fictive intermediate winding shifted by a distance T/2 from the inductor winding, i.e. in quadrature with it.

The electronic means are suitably arranged to shift inductor and induced windings in a periodic sequence so as to obtain 6 samples over a spatial period T resulting in a periodic signal whose fundamental component obtained by filtering exhibits a phase shift proportional to the displacement at the rate of one complete turn per spatial period T.

Thus only four connections are required between the meander windings and the electronic measuring means. These three meanders, even if implemented on a printed circuit, can have a spatial period T under a millimeter, allowing high accuracy with simple electronic means. Such a sensor is simple, rugged, accurate and easy to miniaturize. Its low current consumption allows its use in small battery operated instruments which need to be insensitive to water and other contaminants, such as calipers.

BRIEF DESCRIPTION OF THE DRAWINGS

Other advantages stand out from the characteristics expressed in the claims and from the description below, disclosing the invention at length with the help of drawings schematically displaying by way of example an embodiment of the invention and some variants.

DESCRIPTION OF THE PREFERRED EMBODIMENTS

Figure 1:
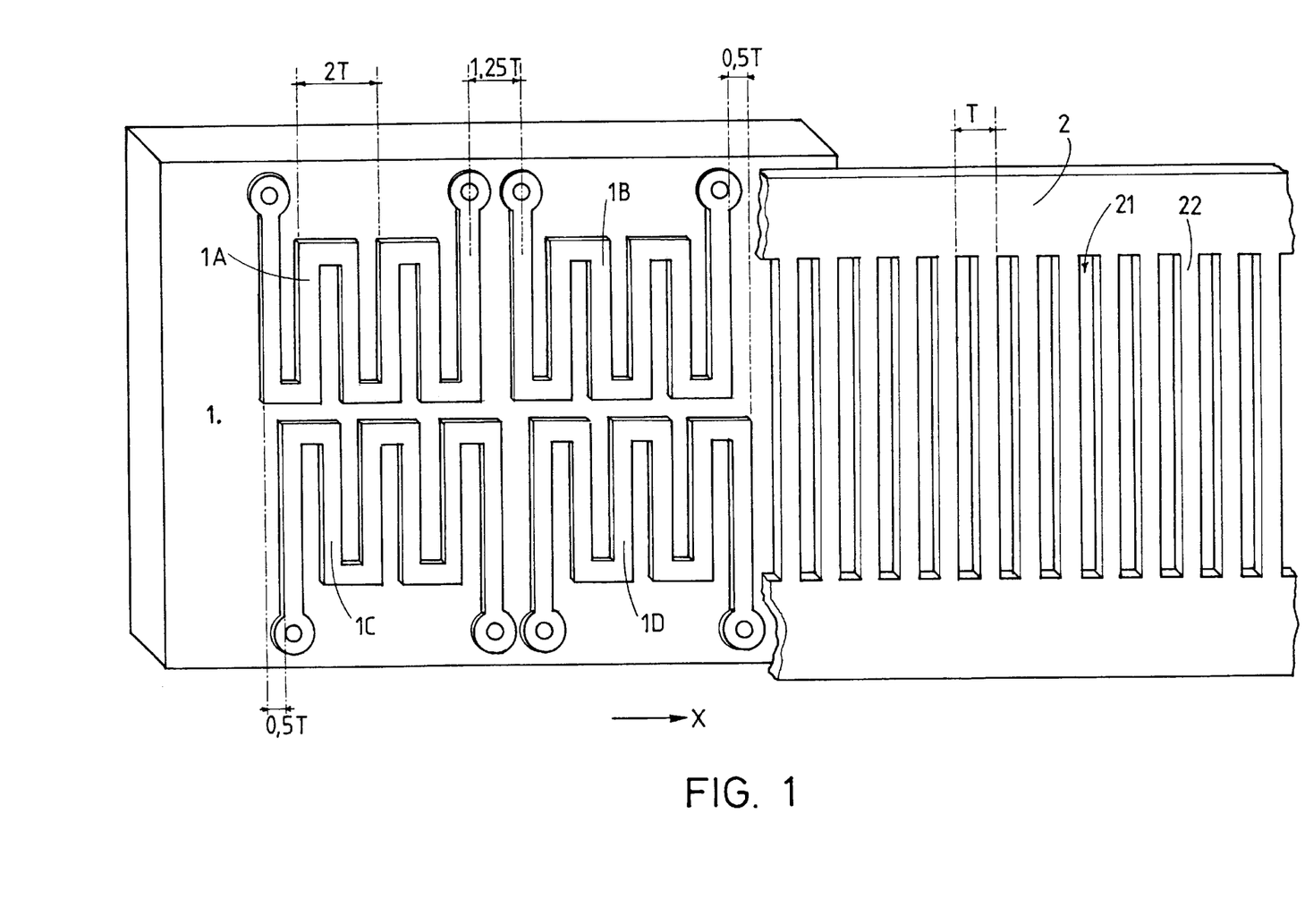
FIG. 1 shows by way of example both relatively movable elements of a sensor according to the invention, the first element comprising four flat meander windings and the second element being a conducting tape with windows.

Both elements of a sensor according to the invention, movable relative to each other along a path or axis x, are shown in FIG. 1. The first element 1, e.g., a cursor, has four conducting windings 1A to 1D in the shape of meanders or alternating hairpin turns, on the surface facing the second element 2, whose right hand part only is visible so as not to hide the first element 1. The second element 2, e.g., a ruler or scale, is a conducting tape featuring a row of windows 21 along the x-axis, and constitutes the measuring scale. The spatial period, or pitch, of the windows is defined as T. The meanders 1A to 1D on the element 1 have a pitch of 2T along the x-axis, enabling them to induce or detect electromagnetic fields having the same spatial period 2T. Coupling from inducting to induced meander windings is influenced in a spatially periodic way by the measuring scale 2, as conducting areas around the windows 21 form as many current loops relaying the coupling from inducting to induced windings. The direction of rotation of these currents alternates from one window to the next, so that they reinforce each other in the conducting parts or traverses 22 between windows 21. The electromagnetic field thus stays confined near the meander windings, allowing the use of high measuring frequencies for short measurement acquisition times, e.g., for sensors in fast control loops, or of very short pulses at a repetition rate low enough for low average current consumption, if the sensor is part of a battery-operated instrument.

Coupling is preferentially measured between meander windings in quadrature, i.e., mutually shifted by a quarter of their pitch along the x-axis, namely T/2, as this minimizes their mutual inductance. In FIG. 1 meander winding pairs in quadrature are 1A, 1C and 1B, 1D, each pair being obviously laid out so as to face the same scale 2 windows 21 to allow coupling via them.

Figure 2:
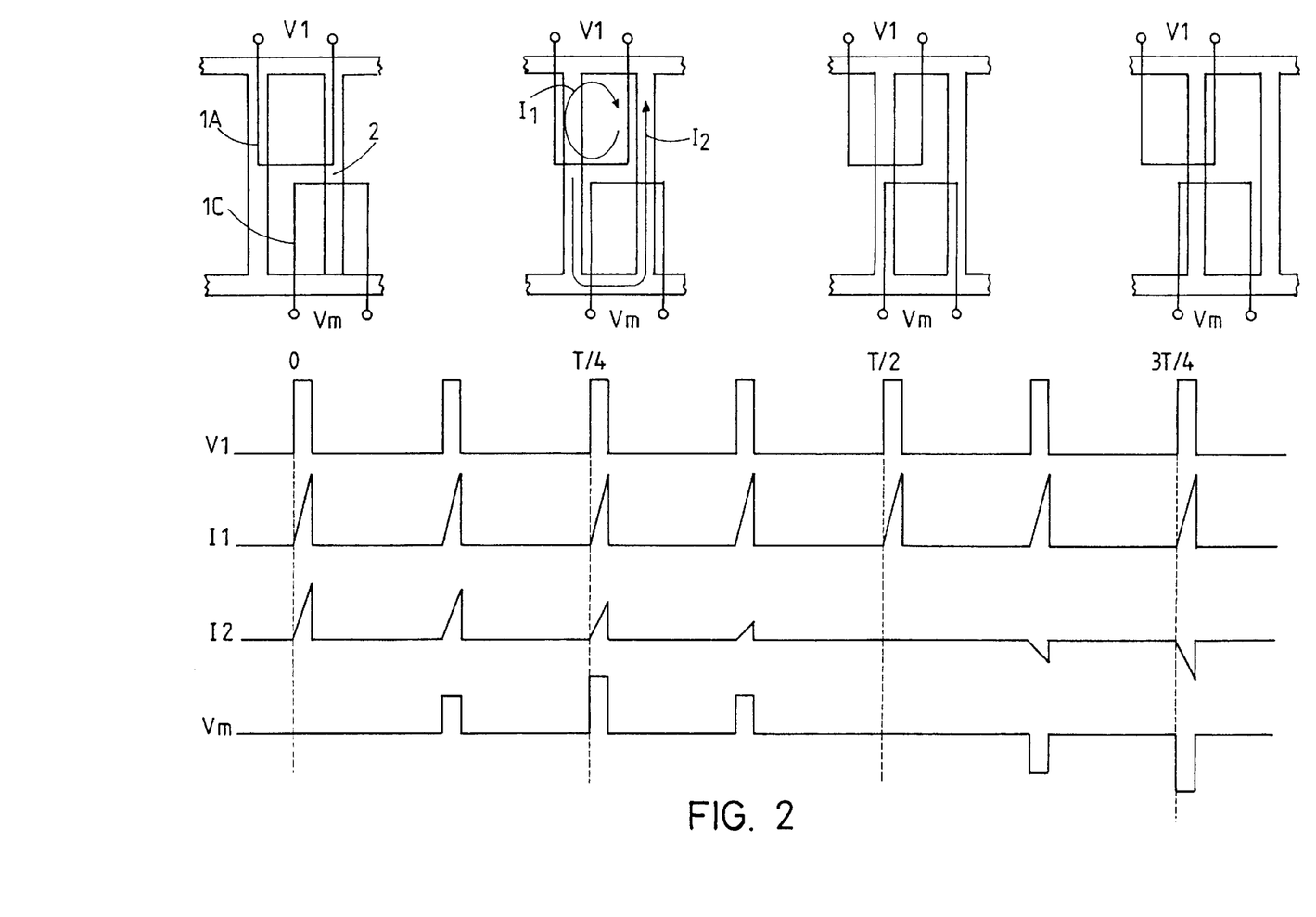
FIG. 2 shows the signals on two meander windings as a function of the displacement of a second element or scale.

Coupling from one meander winding to the other for an imaginary scale displacement at uniform speed is very schematically shown in FIG. 2 for four instantaneous positions successively shifted by T/4, along with the inducting and induced signal waveforms during this displacement. The driving voltage V1, which may consist in a series of rectangular pulses, is applied to the terminals of winding 1A, giving rise by its self-inductance to ramp shaped current pulses I1 through winding 1A. These pulses I1 induce currents I2 around the scale 2 windows 21 facing windings 1A, 1B, and these currents I2 in turn induce voltage pulses Vm at the terminals of windings 1C, 1D. For the initial configuration 0 (zero), at the left of FIG. 2, currents I2 in the scale 2 have maximum amplitude, as the coupling or mutual induction between winding 1A and scale is at its strongest; on the other hand, the voltage Vm is nil at the terminals of winding 1C as it is in quadrature with the scale. A T/4 shift of the scale reduces the coupling between winding 1A and scale, but reinforces it between the latter and winding 1C; the product of both couplings is at a maximum here, thus also the voltage Vm at the terminals of winding 1C. For a T/2 shift winding 1A and scale are in quadrature, which nulls the voltage Vm. Finally, for a 3T/4 shift, the voltage Vm is at a maximum again, but with a polarity opposed to voltage V1, as the relative coupled winding polarity has changed. Intermediate pulses are also shown in FIG. 2 to better see the periodic variation of voltage Vm with displacement, the spatial period being T.

The voltages Vm obtained from both winding pairs in quadrature 1A, 1C and 1B, 1D, mutually shifted by 1.25 T in FIG. 1, are therefore periodic functions of the displacement along the x axis, of spatial period T, and mutually shifted by T/4, thus enabling an unambiguous determination of the amount and direction of displacement along the x axis.

As a remark, it is also possible to measure the coupling effect of the scale in the inducting winding itself, as its self-inductance is also influenced by the proximity of the second element; but for the degree of coupling typical of such sensors, the self-inductance variation due to the scale is weak, of the order of 10%, meaning that small variations of this inductance from other causes, e.g., geometric flaws or connection wires, may lead to large errors as they cannot be distinguished in this case.

The winding pattern 1A to 1D in FIG. 1 only needs one metal layer. On the other hand, it is not compact and the second element or scale 2 embodiments are limited in that they need to provide coupling between at least two separated windings. Additionally, the coupling degree is reduced, as each winding covers only half a window's perimeter.

Moreover, coupling is impossible between windings distributed along x, e.g., 1A and 1B in FIG. 1.

Figure 3:
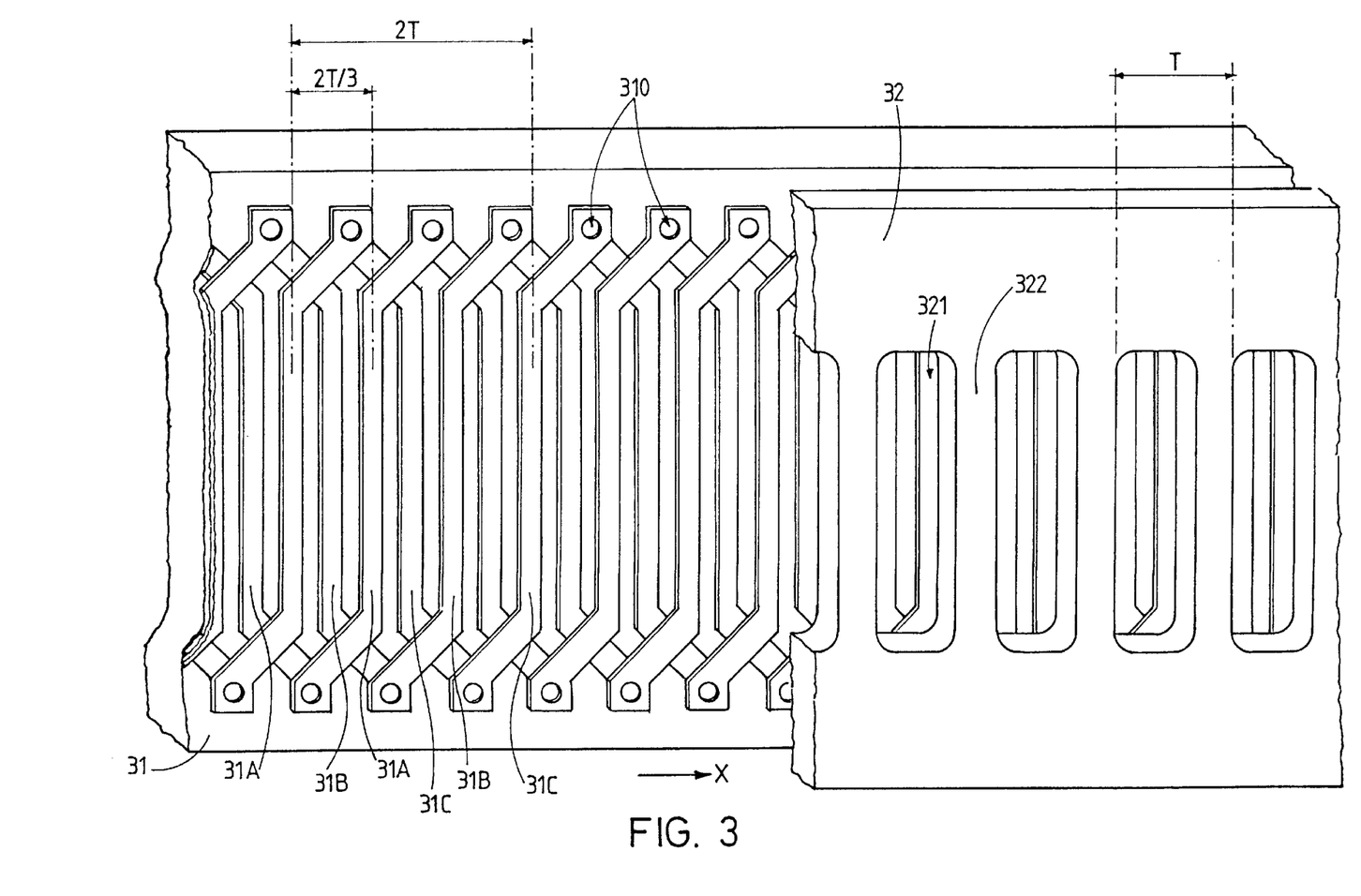
FIG. 3 partly shows both elements of a sensor according to the invention, with a first element having three interlaced windings.

It is thus extremely advantageous, in a sensor according to the invention, to have interlaced meander windings, shown by way of example in FIG. 3. All the above-mentioned drawbacks are thus eliminated at the expense of one additional conducting layer, whose cost may be offset anyway by the reduced substrate area. Several configurations with an arbitrary number N of interlaced windings are possible this way.

In FIG. 3, a first element or cursor 31 with N=3 interlaced meander windings 31A, 31B, 31C, of pitch 2T and successively shifted by 2T/3, faces a second element or scale 32, here a conducting tape featuring a row of windows 321 and traverses 322 on a pitch T. It can be seen that the first element's 31 windings 31A, 31B, 31C are implemented on two metal layers so they may cross each other. Passage, or ohmic contact, from one meander layer to the other is done via contacts 310. Elsewhere, conductors are insulated by a thin layer, invisible on FIG. 3, as would be the case on a thin-film or an integrated circuit substrate; but this layer may well be thicker, e.g., an insulating layer of a multilayer printed circuit board, or the circuit board itself, the substrate of the first element 31 being then between both conducting layers, contrarily to FIG. 3, where these layers are on the same side of the substrate.

Figure 4:
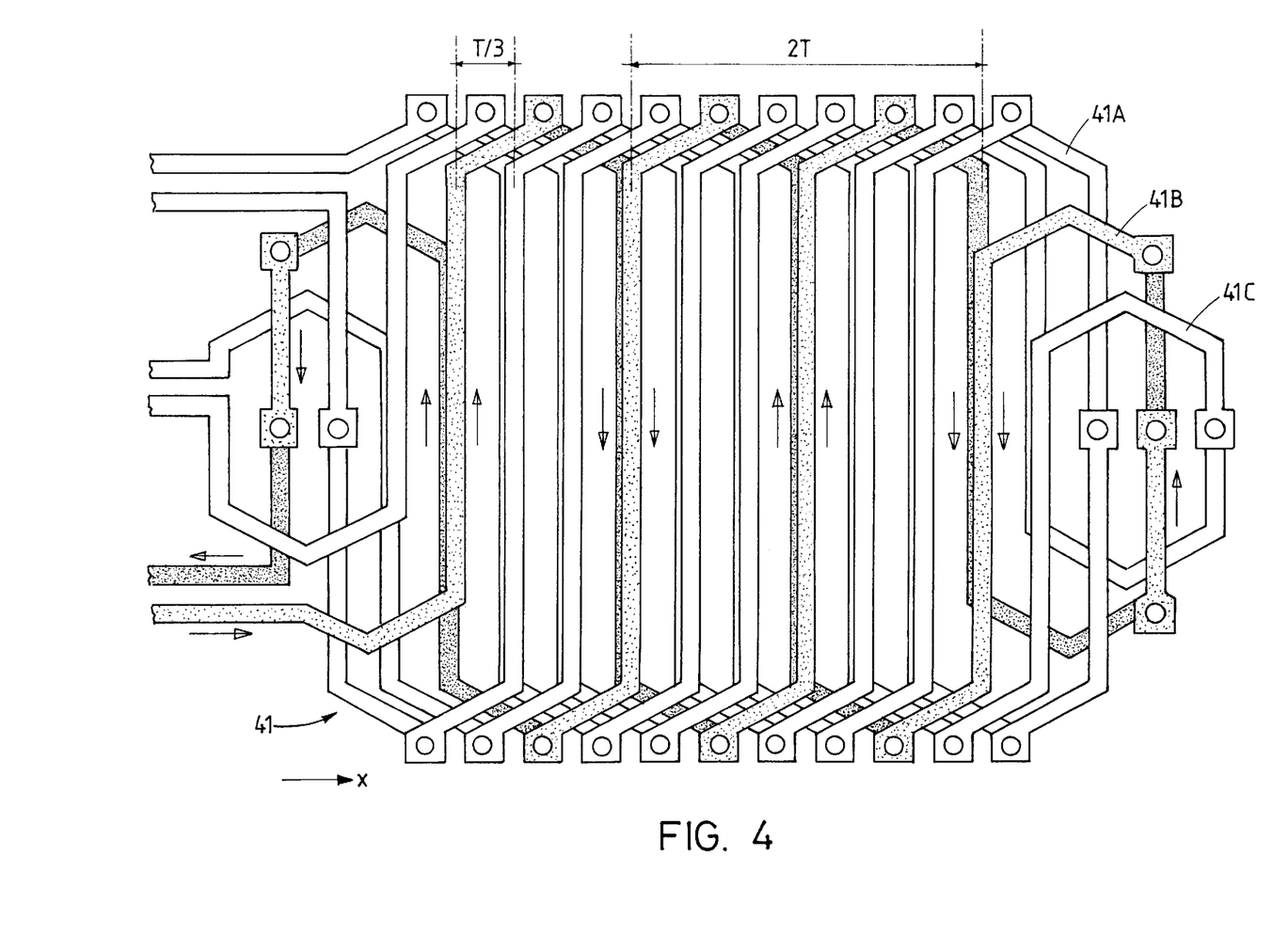
FIG. 4 shows, as a variant, another possible configuration of three interlaced windings.
Figure 5A:
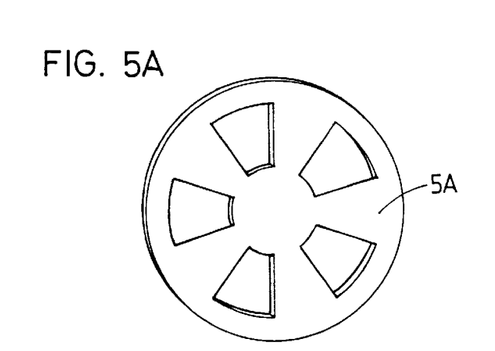
FIGS. 5A to 5E illustrate some examples and variants of second elements according to the invention.
Figure 5B:
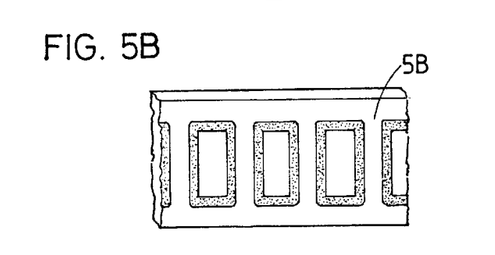
Figure 5C:
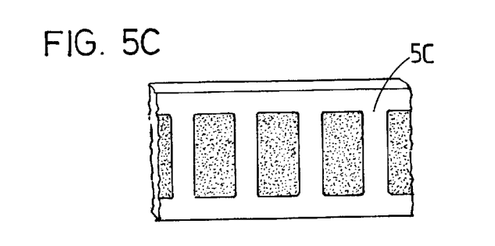
Figure 5D:
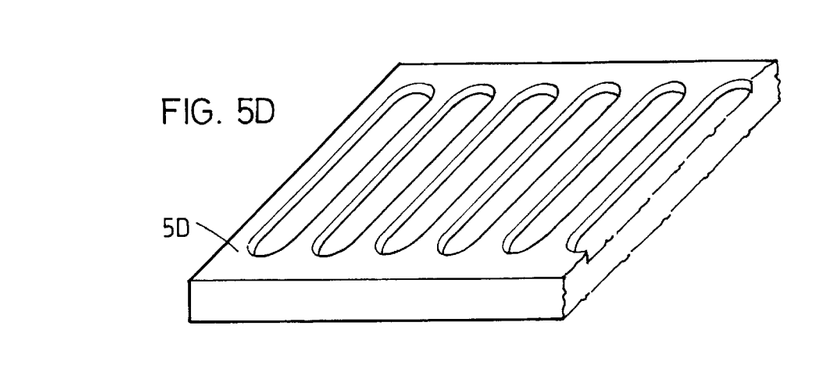
Figure 5E:
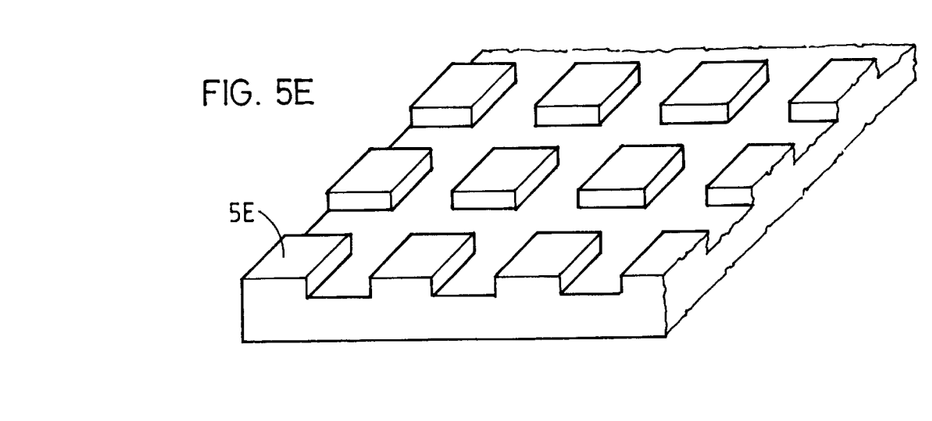

As their contact vias or through-holes 310 have a pitch of 2T/3, the meander windings 31A, 31B, 31C of FIG. 3 are easily implemented on a printed circuit for pitches T of the order of a millimeter. But if the pitch between these contacts can be reduced to T/3, as in FIG. 4, more compact windings are possible. In FIG. 4, each one of the windings 41A, 41B, 41C, is formed by two meanders whose linear sections running across x are superposed, resulting in a fourfold inductance over the same area. This is the case wherein the inducting or induced currents have the same direction in the superposed linear sections, as shown by arrows in winding 41B, enhanced in FIG. 4. As the meanders of each winding go back and forth, i.e., start and finish at the same end, all connections are at one end, minimizing stray inductance and radiation. The windings in FIG. 4 are tapered towards the ends to equalize their mutual inductances and to reduce this finite length configuration's sensitivity to misalignment in linear sensors. In rotary versions, this can also be achieved by distributing the windings over the whole perimeter.

Depending on the application, one of these solutions or some other configuration may be preferred. These interlaced windings use less space, are less sensitive to geometric flaws and work with a variety of scales, which may be conducting as in the examples above or magnetically permeable, the coupling fields being then modulated by the proximity of the traverses 322 of the scale 32.

The scale may be homogeneous as in FIG. 1 or deposited on a substrate. Instead of geometric properties like the windows 21 in FIG. 1, its influence on electromagnetic fields may result from local changes in conductivity, e.g., by doping a semiconductor, or in permeability, e.g., by a magnetic tape. Yet conducting metal scales are especially advantageous for their resistance to abrasion, contaminants and temperature, low temperature coefficient, stability and stiffness. Scales with conductors on insulating substrates are also interesting, as they may either consist of inexpensive printed circuit boards or of conducting films on light but very stable ceramic carriers having a low dilatation coefficient.

A few examples of second elements or scales according to the invention are shown in FIGS. 5A to 5E. Scale 5A is shaped as a conducting disk featuring radial windows for a rotary encoder. Scale 5B is made of conducting loops on an insulating substrate. Both scales can be read by interlaced or non-interlaced windings. Scale 5C has conducting islets in which eddy currents are induced. Conducting scale 5D has a relief pattern, acting by eddy currents under the surface closest to the first element. For good efficiency a relief height of 0.2 T is enough. The conducting or magnetically permeable scale 5E has a two-dimensional relief pattern allowing the measure along both coordinates by two orthogonally aligned first elements. These scales 5C to 5E must be read by interlaced windings. Other scales according to the invention are possible, the optimal scale choice depending on the application.

Figure 6:
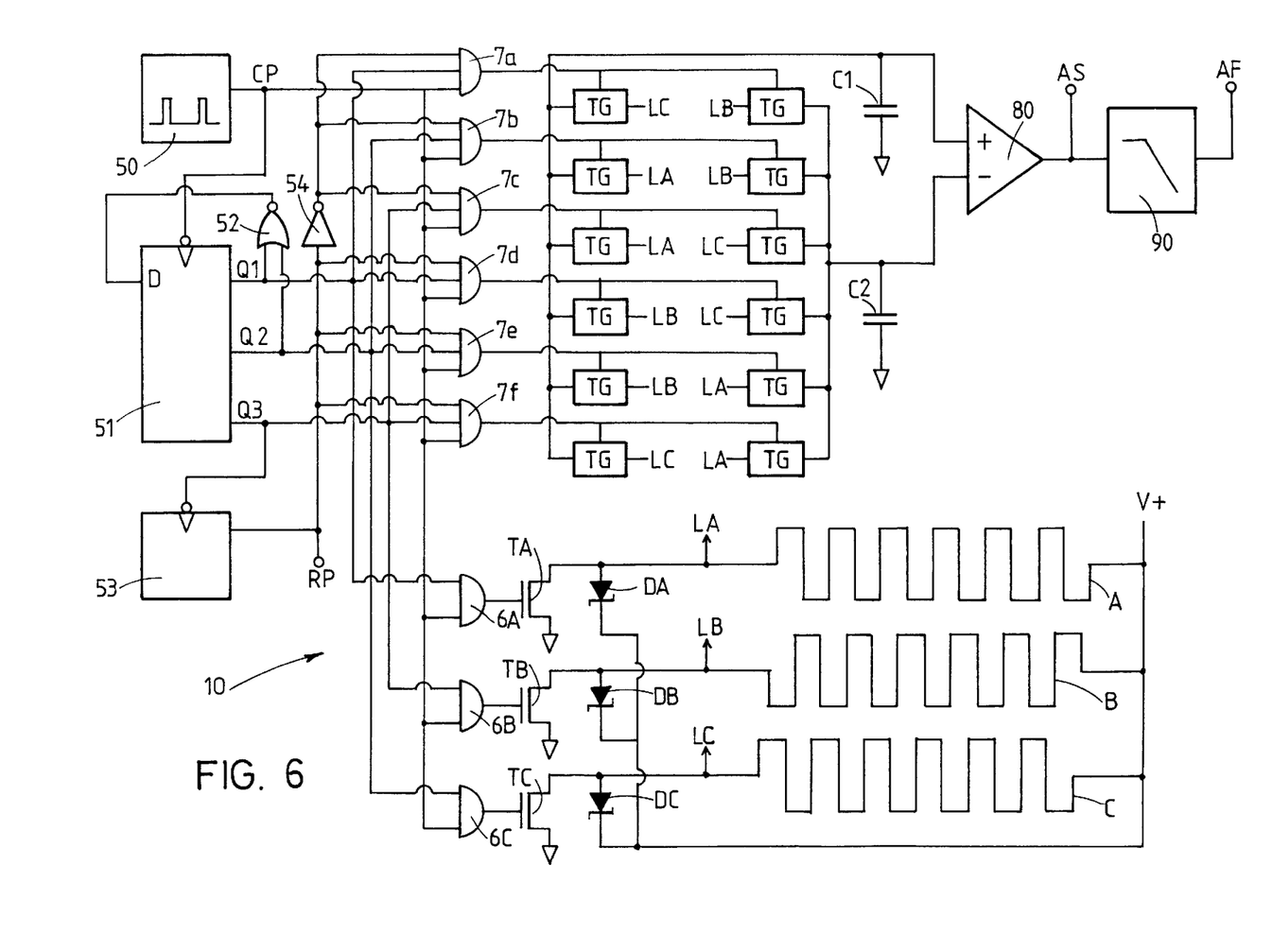
FIG. 6 schematically represents electronic means of a sensor according to the invention with three Y-connected windings.

Electronic means of sensors according to the invention are described hereafter by way of example for a sensor having three windings on the first element, such as illustrated in FIGS. 3 and 4. FIG. 6 schematically shows these electronic means, or circuit, with the three interlaced meander windings A, B, C, shown separately for the sake of clarity. They are Y-connected, i.e., with one terminal each on a common contact, connected here to a positive voltage V+, which may be the circuit's supply voltage. The remaining terminals LA, LB, LC, are respectively connected to driver transistors TA, TB, TC, to surge absorbing diodes DA, DB, DC, and to identically named terminals LA, LB, LC of transmission gates or switching transistors TG. The driver transistors are N-channel MOS enhancement types.

The measuring principle is as follows. Coupling via the scale is measured by generating a voltage pulse on winding A and simultaneously sampling the difference between the induced voltages on the other windings B and C, the inductor and induced windings being thus in quadrature, as will be seen further.

This coupling varies in a spatially periodic manner, with a spatial period T as explained with reference to FIG. 2, and a periodic sampled voltage sequence can thus be simply obtained by generating the next pulse on the following winding B and sampling the voltage difference between the next windings C, A, etc. This sequence yields three samples per period, which is sufficient to find the phase of the sampled signal.

This phase varies linearly with the displacement as long as spatial harmonics of the coupling characteristic are negligible. This is usually the case, given that even harmonics are weak, that the third harmonic is not sampled and that those of order five and above are strongly attenuated for a sufficient gap, about 0.2 T, between the winding's and the scale's surface. In fact, spatial harmonics of a meander winding's electromagnetic field decrease exponentially with the gap, a harmonic of order m decreasing by half for a gap of 0.22 T/m. The signal phase may then be computed as a function of the numerical amplitude and polarity values of said three sampled voltages.

The electronic means described here by way of example and illustrated in FIG. 6 determine the phase directly by filtering a signal sampled six times per period, low-pass filtering being simpler for more samples per period. The spatial harmonic three is now sampled, but can be filtered. But harmonic 5, on the contrary, is now rejected on the fundamental by sampling, so it has to be attenuated before, e.g., by the shape of the meanders and the scale or simply by a sufficient gap, as pointed out above.

Figure 7A:
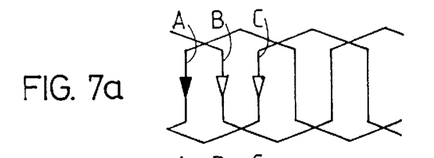
FIGS. 7a to 7f shows a sequence of six coupling signal configurations on these three meander windings.
Figure 7B:
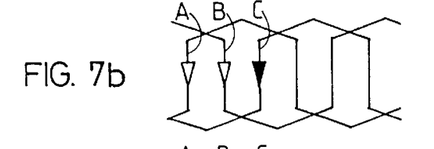
Figure 7C:
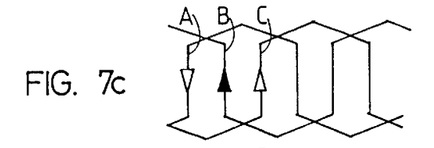
Figure 7D:
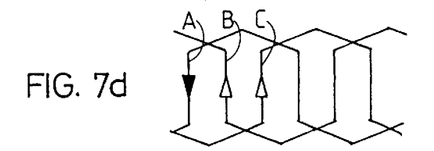
Figure 7E:
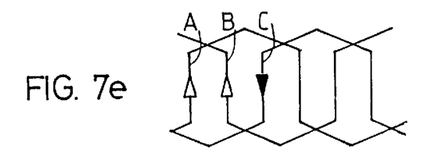
Figure 7F:
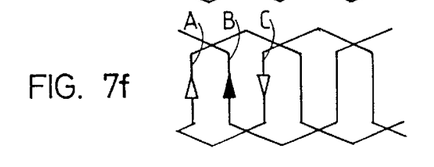

FIGS. 7a to 7f show one way of generating, with three Y-connected windings as shown in FIG. 3, a sequence of six coupling configurations per period T while respecting quadrature between inducting and induced windings. The Y-connected interlaced meander windings A, B, C are displayed with their common terminal to the right; for windings as shown in FIG. 4, each made of two overlapping meanders going back and forth, all terminals would obviously be on the same side. Black arrows mark the inducting winding and the inducting current's direction, and white arrows mark the induced windings and the measuring polarity. In FIG. 7a winding A is inducting while windings B, C are induced. As the latter's adjacent line sections have the same measuring polarity, they are thus equivalent to a fictive intermediate winding in quadrature with the inductor winding, so their net mutual coupling in the absence of a scale is nil. The winding configuration shown implies always opposed measuring polarities at the terminals: in FIG. 7a, the white arrow marking the polarity of winding B points away from terminal LB, while the one marking winding C points towards terminal LC: a voltage difference is thus measured. Shifting the configuration of FIG. 7a by T/6 would result in the inducting winding being between two windings, both thus becoming inducting, which would increase current and circuit complexity; the fictive induced winding, on the other hand, would coincide with a real one. But, as coupling is measured, it does not matter if inducting and induced windings are exchanged, resulting in the configuration of FIG. 7b, with windings A, B induced and C inducting. Likewise, the remaining configurations, all with one inducting and two induced windings, are obtained by exchanging inductor and induced windings after each T/6 shift. Finally, the arrows are reversed in FIGS. 7c, 7d to obtain always the same current direction into the windings for simplifying the driver circuits; by also inverting the measuring polarities, the coupled signal polarity remains correct.

Figure 8:
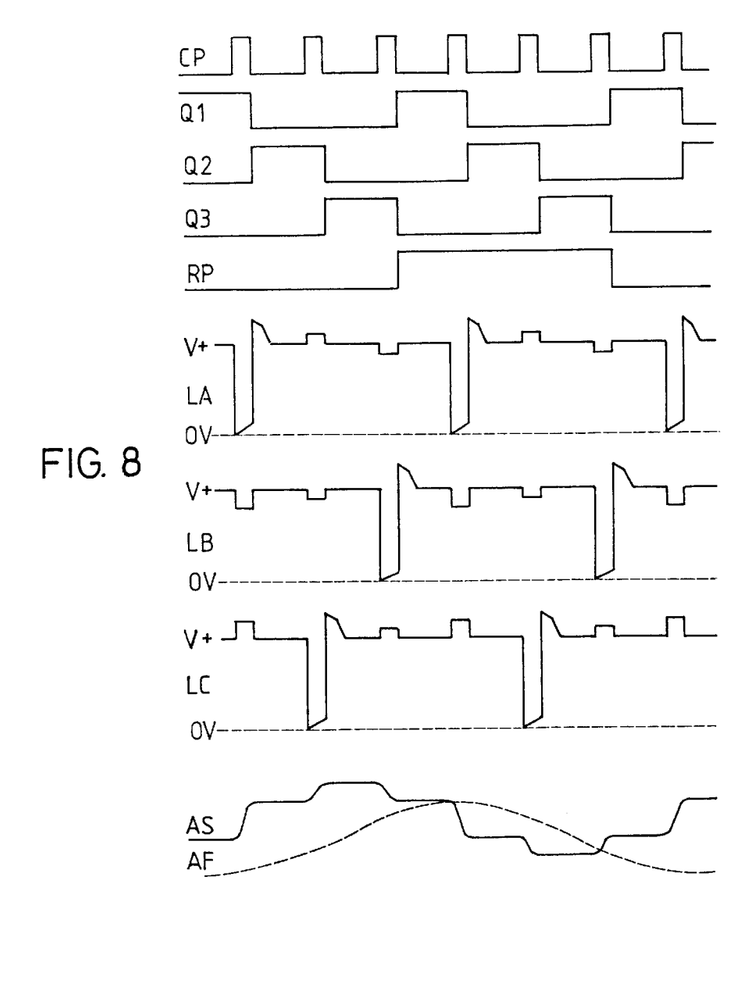
FIG. 8 displays logic and analog signal waveforms from the electronic means shown in FIG. 6.

These six configurations are generated by the circuit 10 in FIG. 6. To this end, a generator 50 generates a pulse train at its output CP, which clocks a three stage shift register 51 and controls logic "and" gates 6A to 6C and 7a to 7f. The data input D of shift register 51 is controlled by a logic "nor" gate 52 fed by the register's two first outputs Q1, Q2, resulting in a modulo-3 counter, each output Q1, Q2, Q3 being in turn at a logic state 1 while both others are at 0. The change from one state to the next occurs at the CP's signal falling edge. The falling edge on output Q3 toggles a flip-flop 53 whose output RP alternates between logic states 0 and 1. FIG. 8 illustrates the logic waveforms of the signals on CP, Q1, Q2, Q3, RP. Output Q1 is initially shown at logic state 1, outputs RP and CP at logic state 0.

On the rising or leading edge of CP, gate 6A of FIG. 6 is enabled and turns on transistor TA, which pulls terminal LA of winding A to ground (zero Volt). The winding A thus becomes inducting. Simultaneously, gate 7a, receiving on one input the inverted signal RP through inverter 54, has its three inputs at logic state 1 and turns on two transmission gates or switching transistors TG, one of which switches terminal LC of winding C to capacitor C1 and the "+" input of differential amplifier 80, and the other one switches terminal LB of winding B to capacitor C2 and the "−" input of amplifier 80. One thus obtains the configuration of FIG. 7a and may easily check that the configurations of FIGS. 7b to 7f are also generated by the circuit in FIG. 6.

At the end of the pulse on output CP, transmission gates TG are turned off and capacitors C1 and C2 have stored the voltages induced in windings C and B; the driver transistor TA is turned off. FIG. 8 also displays the waveforms on terminals LA, LB, LC, as well as the sampled and amplified differential signal AS on the amplifier 80 output, and the filtered signal AF at the filter 90 output. By measuring the phase shift between the signal AF and the reference signal RP, one gets a phase shift proportional to the displacement, at the rate of 360 degrees per spatial period T of the scale. Measuring a phase shift over any number of periods is well known. By way of example, it can be reduced to a time difference between same polarity transitions of the signal AF and the reference phase RP. But as a phase shift corresponding to an integer number of pitches T yields a zero time difference between said transitions, there is a measurement ambiguity which can only be removed by taking into account the number of periods of the displacement: a displacement over several pitches will thus correspond to a phase shift over the same number of turns or periods. For this, the sampling rate should obviously be high enough to track the displacement at maximum speed without missing one or more pitches T.

In the implementation of such a sensor care must be taken to get windings of equal self-inductance and to minimize and/or equalize their direct mutual inductance. Also the lines connecting the winding terminals should be short or laid out to contribute as little as possible to these inductances. A good solution is to integrate the circuit on a semiconductor die next to the windings, or even to include the latter on the die. The residual non-linearity may be compensated if necessary by electronic means or by adjusting mutual and self inductances, either by the shape of the windings, as for example in FIG. 4, or by the influence of permeable or conducting screens next to the windings.

The small self-inductance of such meander windings, typically one microhenry or less, entails very steep current rises of several Amperes per microsecond: to limit current consumption, pulse duration should be under 100 ns. An upper limit is also given by the time constant L/R, where L is the winding's self-inductance and R its resistance plus the driver transistor's output resistance. It varies from a few nanoseconds (integrated circuit windings) to about 100 ns (printed circuit windings). The switching parameters of modern CMOS transistors are adequate for such pulse durations. Moreover, these parameters drift slowly enough to secure pulse uniformity over short times for good measuring accuracy. Current rises being steep during these pulses, the signal-to-noise ratio is high and the measurement is not sensitive to electromagnetic radiation the more so as induced voltages are of the order of 0.1 V for a supply voltage of 3 V. To keep a low current consumption, there should be sufficient time between pulses. A time of 50 microseconds, corresponding to a displacement of 0.125 mm (T/6) for a scale pitch T of 0.75 mm, would allow tracking of displacements at speeds below 2.5 m/s. With a pulse duration of 50 ns, a supply voltage of 3 V and a self-inductance of 1 microhenry, the average current consumption is about 75 microamps, which is adequate for a measuring instrument such as a caliper. The small scale pitch and the simple interpolation makes measuring accuracies of the order of a micrometer possible.

Embodiments of the invention are of course not limited to those disclosed above, and may be suitably modified within the scope of the claims.

In particular, said electronic means 10 may bring about an electric current in at least one of the first element's windings and measure the effects due to the position of the second element's spatially periodic electromagnetic characteristics on the same winding's self-inductance.

There may be an arbitrary number of windings, interlaced or not. The windings' geometry may be quite different, e.g., constituted each by one or a number of spirals on one, two or several layers. Magnetically permeable elements may be used to improve these windings' performance.

The second element or scale may be implemented differently: e.g., for short scales, closed meander windings, i.e., with their terminals shorted, may be useful, as spatially distinct (i.e., non-interlaced) windings could then be used in the first element or cursor, as they would all couple to the same scale winding. Such an arrangement would be especially useful in a small rotary encoder, with a closed scale meander winding around the whole periphery.

The sensor's two elements may be relatively movable along a linear, curvilinear, helicoidal, or any other path x.

The electronic means 10 could be implemented in a very different way, the selection of inducting and induced windings, as well as the evaluation of the signal induced as a function of the displacement being done by other components.

Finally, the combination of two or more sensors according to the invention, aligned along the same path, but with different scale pitches, allows unambiguous position readings over a range much larger than a single's scale pitch, i.e., an absolute position reading within the range.

I claim:

1. An inductive displacement sensor comprising:
   two elements movable relatively to each other along a path (x), provided with windings arranged along said path and whose mutual inductances vary as a periodic function of the relative displacement of said two elements, and
   electronic means for determining a value of said displacement from measuring said windings' mutual inductances,
   said windings being arranged on a first of said two elements,
   the second of said two elements comprising spatially periodic electromagnetic characteristics of spatial period T along said path susceptible to modify said windings' mutual inductances,
   wherein the first element comprises at least N≧2 of said windings arranged with a mutual spatial shift each relative to the other(s) in a measuring plane on said first element and connected to separate connections of said electronic means, which are adapted to generate temporarily an electric current in at least a first of said windings becoming temporarily an emitting inductor during first predetermined time intervals and to measure the signals induced in at least one of the remaining of said windings becoming temporarily a receiving winding and influenced by a position of the second element's spatially periodic electromagnetic characteristics, and to further generate temporarily according to a given time sequence an electronic current in at least a second of said windings becoming temporarily an emitting inductor during second predetermined time intervals and to measure the signals induced in at least one of the remaining of said windings becoming temporarily a receiving winding.

2. The sensor according to claim 1, wherein said first element has said windings with a spatially periodic configuration of spatial period 2T along said axis.

3. The sensor according to claim 1, wherein said N windings are interlaced on a same surface and mutually shifted by an integer number of times the distance T/N along said axis, N being an integer.

4. The sensor according to claim 1, wherein said second element comprises an at least partially conducting spatially periodic configuration of spatial period T along said axis.

5. Sensor according to claim 4, characterized in that the inductive mutual coupling between first element windings may be realized via induced currents or eddy currents in the second element.

6. The sensor according to claim 1, wherein said second element includes one of a series of conducting rings or areas on an insulating substrate, a conductor shaped as a ladder or a punched tape, and a periodic relief pattern.

7. The sensor according to claim 1, wherein said electronic means is for measuring mutual inductance between said windings of self-inductance L and resistance R by applying on terminals of at least one of said windings a voltage pulse shorter than the time constant L/R and by measuring an induced pulse on terminals of at least one other of said windings.

8. The sensor according to claim 1, wherein said windings are each made of two partially superposed meanders going back and forth, connected together on one end and to said electronic means on the other.

9. The sensor according to claim 1, wherein said windings are tapered towards both ends of the first element.

10. An inductive displacement sensor comprising:
    a first element having a longitudinal axis, a first winding, and a second winding spatially offset from said first winding, said windings defining a measuring plane of said first element;
    a second element movable relative to said first element in a plane parallel to said measuring plane and having spatially periodic electromagnetic characteristics spaced a period T apart from each other; and
    electronic means for determining relative displacement of said first element and said second element, each of said windings having separate connections to said electronic means,
    said electronic means temporarily generating an electric current in said first winding, said first winding thereby becoming an inductor temporarily during a first time interval, said electronic means measuring electrical signals induced in said second winding by a position of said electromagnetic characteristics,
    said electronic means temporarily generating an electric current in said second winding, said second winding thereby becoming an inductor temporarily during a second time interval, said electronic means measuring electrical signals induced in said first winding by a position of said electromagnetic characteristics.

11. The sensor according to claim 10, wherein said windings are mutually spatially offset along said longitudinal axis of said first element.

12. An inductive displacement sensor comprising:
    a first element having three Y-connected meander windings, which define a measuring plane of said first element;
    a second element movable relative to said first element in a plane parallel to said measuring plane and having spatially periodic electromagnetic characteristics a period T apart from each other, each of said meander windings offset relative to an adjacent one of said meander windings along said path by a distance of an integer times T/3; and
    electronic means for determining relative displacement of said first element and said second element, each of said meander windings having separate connections to said electronic means,
    said electronic means generating an electric current in one of said meander windings by applying a voltage pulse to terminals of said one of said meander windings and measuring an electric current in the remaining two of said meander windings induced by a position of said electromagnetic characteristics by combining induced pulses in said remaining two meander windings to obtain a sampled signal equivalent to a signal from a fictive intermediate winding offset by a distance T/2 from said one of said meander windings.

13. The sensor according to claim 12, wherein said electronic means is for shifting inductor and induced windings in a periodic sequence so as to obtain 6 samples over said spatial period T resulting in a periodic signal whose fundamental component obtained by filtering exhibits a phase shift proportional to the relative displacement at a rate of one complete turn per spatial period T.

14. The sensor according to claim 13, wherein said electronic means comprise a pulse generator, connected to a shift register whose outputs control driver devices to make each winding inductive in turn and transmission gates to transmit the voltage signals induced in both other windings to measuring devices.

* * * * *